Nov. 11, 1952            A. L. KLEIN            2,617,252
ROTARY TURBOCOMPRESSOR JET ENGINE AFTER-BURNER
Filed Nov. 7, 1947
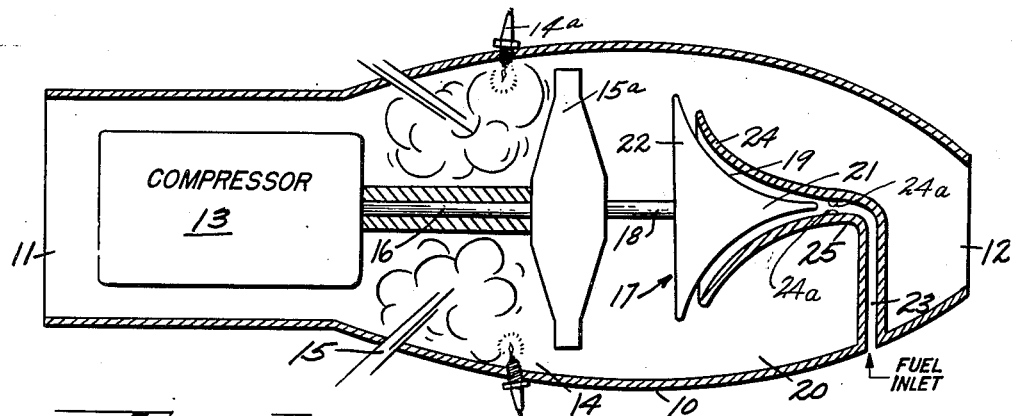
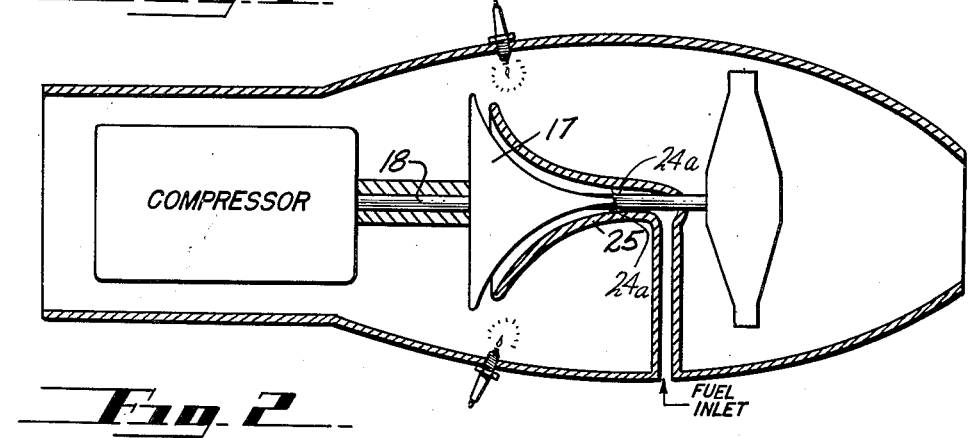
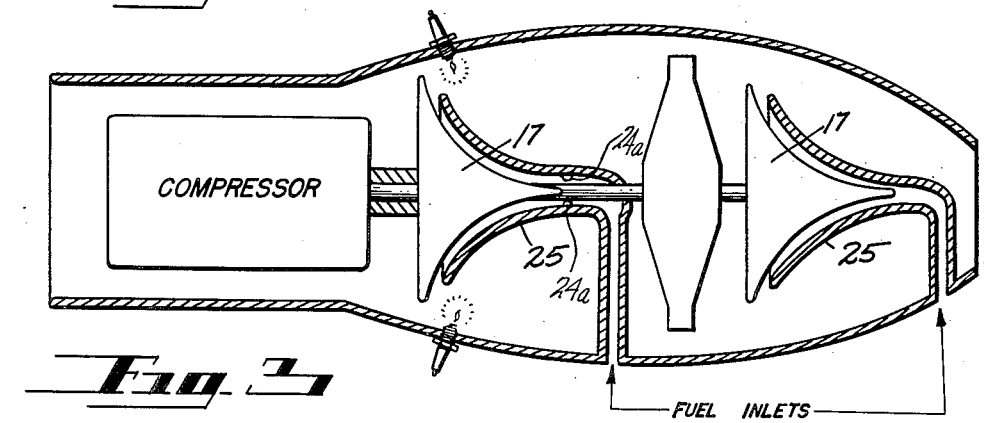
INVENTOR.
ARTHUR L. KLEIN
BY
Edwin Coates
ATTORNEY Patented Nov. 11, 1952

2,617,252

UNITED STATES PATENT OFFICE 2,617,252

ROTARY TURBOCOMPRESSOR JET ENGINE AFTER-BURNER

Arthur L. Klein, Los Angeles, Calif., assignor to Douglas Aircraft Company, Inc., Santa Monica, Calif.

Application November 7, 1947, Serial No. 784,561

8 Claims. (Cl. 60—35.6)

This invention relates to jet propulsion plants and particularly to the combustion apparatus thereof. While the invention is especially concerned with improving the combustion efficiency and boosting the jet force of turbo-jet engines, it is by no means limited in its scope to such engines. For, as hereinafter made apparent, the invention is equally well applicable to ram-jet, or athodyd, propulsion plants.

Although it has hitherto been proposed to improve the combustion efficiency and boost the jet action of jet engines, as by injecting supplementary fuel into the engine casing rearwardly of the main combustion chamber, thus to effect secondary combustion, the prior proposals fail to materially increase the combustion efficiency and thrust of the engine.

Among the reasons for their failure may be mentioned the fact that the supplementary fuel is, in all these proposals, injected in the form of a conical jet constituted by separate streams of liquid. These liquid streams lose their energy and dissipate before the fuel reaches all portions of the compressed air or the rearwardly exiting combustion gases. Hence the combustion gases and the supplementary fuel are not completely mixed and combined, and the resultant incomplete combustion naturally impairs the thermodynamic efficiency and jet-force of the engine. In an attempt to cause more of the fuel to mix with the gases, it has been proposed to multiply the number of injectors. However, this expedient effects the injection into the combustion gases of such a large volume of relatively cold supplementary fuel that the gases are materially cooled thereby. In fact, the temperature of the gases falls to such a low degree that ignition becomes difficult, especially at high altitudes. In an attempt to remedy this situation, complex and delicate auxiliary ignition systems have been proposed in order to ignite the relatively cold excess fuel. These auxiliary ignition systems, however, besides being expensive and cumbrous and sometimes unreliable, impose an extra load on the electrical generating system, which is undesirable.

The present invention resolves the aforestated and other difficulties and enhances the efficiency of jet engines, effecting efficient mixture of fuel and gas in the main combustion chamber and substantially completing the main combustion by means of a secondary combustion, in such a manner as to augment the general thermodynamic efficiency of jet engines and to boost the jet force of a given sized engine. It may also be employed to enhance the mixing of fuel and compressed air in the main combustion chamber.

In doing so, it employs but one fuel introducing means, taking the form of a rotary and shrouded member constituting a vaporizer and centrifuge, and, if desired, also serving as a pre-heater. This member functions, first, to reduce the liquid fuel to a true vaporous condition before it is contracted with the combustion gases, instead of merely spraying same into the chamber in the form of cones each made up of separate needles of liquid. In the vaporizing process, the fuel spray may be pre-heated and thereby partly reduced to gaseous form, by the heating action of the shroud and the rotary member. The rotary member then centrifugally distributes the vaporous fuel radially and peripherally of the engine casing, mixing it equally and uniformly with all portions of the compressed air in the main chamber or with the combustion gases rearwardly of this chamber, or in both, as desired, depending upon the location of the vaporizer. The fuel vapors are forcibly mixed in the main chamber with the compressed air to improve the fuel-air ratio and enhance combustion efficiency, and in the secondary chamber the fuel vapor entirely consumes the excess super heated oxygen ordinarily contained in the rearwardly exiting combustion gases, whereby to finish combustion thereof and boost the jet-force. Since the quantity of fuel required is less than that heretofore necessary to obtain the same fuel air mixture and jet-force, and as the present injection means may be made to effect pre-heating and gasification of the incoming fuel, the combustion gases cannot be cooled to such an extent as to impair ignition, prevent complete combustion, or otherwise reduce the thermodynamic efficiency and jet-force of the engine. Since no auxiliary ignition means are required, there is no undue drain on the fuel supply, as for generating auxiliary high electrical potentials.

The now preferred constructional embodiment of the invention essentially comprises, in its broadest aspect, a rotary surface that is smooth and uninterrupted on its active face which is adapted to vaporize and centrifuge fuel impinging thereon, this surface extending at least partly transversely of the casing and being rotatably mounted coaxially thereof, either in the main or in the secondary combustion chambers, or one in each chamber. A fuel conduit extends into the casing and its inner end is arranged to discharge fuel onto the rotary surface. The rotary surface may take the form of a transversely extending circular plate or disk; a conical or cusp-shaped member disposed coaxially of the casing with its apex located rearwardly; or some other equivalent surface adapted to receive the fuel and centrifugally discharge same while breaking it up into vaporous form. In any environment of the rotary surface, the vaporizer and centrifuge forms the liquid fuel directed thereon into a vaporous body and then centrifugally impels this vapor radially outwardly toward the casing walls in the form of a circumferentially swirling, uniform, homogeneous annular mass, or sheet, of extremely finely subdivided fuel particles. In order to prevent combustion of the fuel before it has been fully vaporized, the fuel conduit may terminate inwardly adjacent the rotary surface in the form of a hood or shroud that coaxially envelopes the rotary member from its rearward face almost to its forward face, thus leading the fuel protectedly to the outer periphery of the rotary member.

The other features and accomplishments of the invention will become apparent as this disclosure proceeds.

Several of the presently contemplated constructional embodiments of the inventive concepts are illustrated in the accompanying drawing and described hereinafter in conjunction therewith, but by way of example and clarification only. Accordingly, it is to be definitely understood that the invention is not limited, as to the forms which it can take, to these embodiments, being in fact and in law capable of incorporation in any physical form lying within the scope of the annexed claims.

In the drawing:

Figure 1 is a longitudinal diagrammatic section of the presently preferred embodiment of the invention, with the vaporizer-centrifuge disposed aft of the turbine motor in a secondary combustion chamber;

Figure 2 is a similar view showing one of the vaporizer-centrifuges disposed in the main combustion chamber; and Figure 3 is a similar view showing one of the vaporizer centrifuges located in each of the combustion chambers.

In the form of the invention illustrated in Figure 1, the engine comprises an elongate casing 10 adapted to be mounted longitudinally of a vehicle to be propelled thereby, such as an airplane. The casing is open at its front end to provide an air intake 11 and is also open at its rear end 12 to provide or to lead to a jet discharge nozzle. Mounted coaxially of the casing near the air intake is a conventional air compressor 13 adapted to compress the intaken air and discharge it rearwardly of the casing. Rearwardly adjacent the compressor, the casing is enlarged to provide a main combustion chamber 14, into which, in the illustrated form, fuel is injected by conventional fuel injection means 15. The injected fuel is appropriately mixed in chamber 14 with the compressed air and the mixture is continuously ignited therein by conventional firing means, such as spark plugs 14a properly arranged in the walls of the main combustion chamber.

A gas turbine, the rotor 15a of which is shown, is disposed transversely across the rearward boundary of the main combustion chamber. The hub of the rotor is drivingly connected to the rotor shaft of the compressor by means of a drive shaft 16, in order to effectuate intake of the airstream and discharge of compressed air from the compressor into the main combustion chamber.

A power-driven, positively acting rotary vaporizer and centrifuge 17 is mounted coaxially of the casing entirely rearwardly of the main combustion chamber and is drivenly connected to the turbine rotor by a shaft 18 or the like power transmission means. The vaporizer comprises an uninterrupted surface of revolution 19 mounted in rearwardly facing attitude coaxially of the casing on a rearwardly extending shaft in a secondary combustion chamber 20 lying intermediate the turbine rotor and the jet nozzle. The surface includes a portion 21 extending longitudinally of the casing and portion 22 extending transversely of the casing. In the form shown, the rotary member takes the shape of a geometrical solid known as a "cusp-of-revolution," the longitudinal portion of which forms the fuel into a hollow cusp-like envelope to facilitate preheating and better vaporization of the fuel, and the transverse portion of which centrifugally vaporizes and distributes the fuel.

A fuel conduit 23 extends into the rearward portion of the casing, preferably aft of the rearwardly disposed apex of the cusp. The conduit angles forwardly towards the cusp and enlarges therearound coaxially, enveloping same in radially spaced relationship thereto. The envelope 24 extends from the apex of the cusp forwardly to a peripheral circle thereof lying sufficiently rearwardly of its base to define a gap with the transverse surface, permitting emission of the vaporized fuel. The inner surface of the conduit, just forward of its bend, bears two diametrically opposite, radially and longitudinally extending nodes or other protuberances 24a. These nodes cause separation of the fuel flow from the walls of the conduit at this point, creating sufficient turbulence to prevent laminar flow thereof along the conduit walls to the outlet thereof, instead forcing it into contact with the apex of the rotary member and thence forwardly along the surface thereof to its forward periphery.

In the embodiment shown, the nozzle 25 of the fuel conduit and the forward end of the rotary member absorb heat and concentrate it around the fuel envelope surrounding the cusp. This construction and arrangement of the nozzle also assures that secondary combustion cannot take place until the supplementary fuel has become fully vaporized, both by centrifugal force and by heat, being partially gasified by the heat transferred thereto from the envelope and the rotary member.

From the rotating rear peripheral edge of the rotary member, the completely vaporized fuel is centrifugally thrown radially outwardly with a superimposed circumferential swirling motion, thereby being further vaporized. The radially and circumferentially moving vapor mass is forcefully urged transversely of the rearward path of the oxygen-containing combustion gases in the form of a uniform annular mass of extremely finely subdivided liquid particles. Thus, the combustion gases, instead of being directly discharged rearwardly through the jet nozzle with the chemical and heat energy of their uncombined oxygen still incompletely developed, are met by a finely subdivided mist of liquid fuel. The result is completion of the combustion initiated in the main combustion chamber, and an augmentation, or "boost," of the jet force.

The diameter of the base of the rotary member is made such an amount smaller than the outside diameter of the turbine rotor as to dispose the periphery of the rotary member well within the periphery of the turbine rotor. Thus, the rotary member offers no consequential obstacle to the rearwardly exiting combustion gases and develops no thrust-reducing back pressure.

The rotary vaporizing and centrifuging surface might, if desired, obviously be directly carried on the rearward face of the turbine rotor in a rearwardly facing attitude, and hence would lie in a relatively forwardly located portion of the secondary combustion chamber. The fuel conduit in this case, would be constructed as before and be disposed sufficiently forwardly of its Figure 1 location to envelope the rotary member in the manner shown in that figure. In such an embodiment, the device would function substantially as before, the chief advantage of the arrangement lying in the resulting compactness of the interior members of the engine and in the substantial reduction of the overall length of the engine casing, so that the engine may be employed in very small aircraft.

The invention may, as shown in Figure 2, also be incorporated in the main combustion chamber of the engine instead of in the secondary combustion chamber, in order to effect better mixture of the charge in this chamber and augment the fuel-air ratio, with consequent accomplishment of more nearly complete main combustion. In this case, the rotary vaporizer and centrifuge 17 is mounted in rearwardly facing attitude on a drive shaft 18 connecting the turbine rotor and the compressor and adjacent the compressor. The fuel conduit enters the forward part of the main combustion chamber and has a conical nozzle 25 constructed and functioning as before to assist in directing, protecting, and preheating the fuel. The two together form the inlet fuel into a vaporous body directed rearwardly and circumferentially of the casing across the rearward path of the compressed air in the form of an annular homogeneous mass of extremely finely subdivided particles. This mass is forcibly mixed with the rearwardly moving compressed air to form a substantially completely combustible mixture, thereby augmenting the thermodynamic efficiency of the engine and economizing fuel.

In Figure 3, each of the combustion chambers, the main chamber and the secondary chamber, contains one of the vaporizing and centrifuging devices 17 and nozzles or hoods 25 of the invention. Each of the rotary vaporizing and centrifuging surfaces functions as before in connection with the enveloping fuel nozzle to form and direct a vaporous mass of fuel radially and circumferentially of the casing, the one in the main chamber serving to effect almost complete combustion therein, which combustion is substantially completed by the aforedescribed effect of the other device, located in the secondary combustion chamber, so that the thermodynamic efficiency of the engine is increased substantially while the jet thrust of a given sized engine is boosted and thereby augmented materially.

I claim:

1. A turbo-jet propulsion unit in which substantially complete combustion of fuel is effected so as to increase the thermodynamic efficiency and boost the jet force of the unit, comprising: a casing containing a forwardly located air compressor, discharging rearwardly; a source of rotary motion and a primary combustion chamber, including a fuel conduit extending thereinto, situated between said compressor and said source of motion; a rotary member rotatably mounted coaxially of the primary combustion chamber and drivenly connected to said source of rotary motion and including a transversely extending fuel vaporizing and centrifuging surface arranged in juxtaposition with the inner end of said fuel conduit, whereby to effect vaporization and centrifugal discharge radially and peripherally of said casing and into said rearwardly discharged compressed air of a uniform sheet of finely subdivided fuel, thereby to enhance the combustion efficiency of said combustion chamber and reduce the unburned content of the gases rearwardly discharged therefrom; a second fuel conduit entering said casing rearwardly of said primary combustion chamber and having a transversely extending fuel vaporizing and centrifuging surface in juxtaposition with the inner end of the second said fuel conduit, whereby to effect vaporization and centrifugal discharge of a uniform sheet of finely subdivided fuel radially and peripherally of said casing and across the path of the gases rearwardly discharged from said primary chamber so as to effect complete combustion of said gases and of the last said fuel, thereby to complete the combustion cycle of said unit and boost the jet force thereof.

2. A turbo-jet propulsion unit, including: a casing having an air intake at its forward end and a jet discharge opening at its rear end; a main combustion chamber situated intermediate the ends of said casing and including a first fuel introducing means extending thereinto; a transversely extending turbine rotor situated at the rearward boundary of said chamber; an air compressor situated at the forward boundary of said chamber and operatively connected to said rotor to compress air admitted by said intake and discharge same rearwardly; a rotary member rotatably mounted coaxially in said primary combustion chamber and drivenly connected to said rotor and having a transversely extending fuel vaporizing and centrifuging surface in juxtaposition with the inner end of the first said fuel-introducing means, whereby to effect vaporization and centrifugal discharge radially and peripherally of said casing into said rearwardly discharged compressed air of a uniform annular sheet of finely subdivided fuel, thereby to enhance the combustion efficiency of said combustion chamber; a second fuel introducing means entering said casing rearwardly of said primary combustion chamber; and another rotary member rotatably mounted coaxially in said casing entirely rearward of said primary combustion chamber and said rotor and having a transversely extending fuel vaporizing and centrifuging surface in juxtaposition with the inner end of the second said fuel introducing means, whereby to effect vaporization and centrifugal discharge radially and peripherally of said casing and across the rearward path of said gases in said secondary combustion chamber of a uniform sheet of finely subdivided fuel so as to effect combustion of said oxygen and of the last said fuel, thereby to increase the thermodynamic efficiency, and augment the thrust, of said unit.

3. In a turbo-compressor jet propulsion unit of the type that includes a casing having a liquid fuel inlet thereinto, a high efficiency burner, comprising: a rotor; relatively movable fuel-feeding elements mounted in the closure coaxially of the rotor and extending transversely of the casing toward the inner surface thereof, the one of said fuel-feeding elements being rotatably connected to the rotor and the other of said elements being fixedly connected to said fuel inlet and forwardly directed therefrom to a terminus located adjacent the rear face of said rotatable member, said rear face having a rearwardly concave, exteriorly located fuel collecting portion and a substantially radially extending, substantially planar peripheral portion on said rearward face extending from said rearwardly concave portion radially beyond the inner terminus of said fixedly connected element, whereby fuel from said inlet and centrally gathered by said concave face is centrifugally atomized into the vapor phase and directed substantially entirely as a vapor substantially directly radially outwardly in said casing toward said casing wall and substantially perpendicularly to the exit path of combustion products exiting from said casing, thereby to positively assure the complete combustion of said vapor centrifugally radially emitted from said burner.

4. In a turbo-compressor jet propulsion unit that includes a casing having a liquid fuel inlet thereinto, a high efficiency burner, comprising: a rotor; relatively movable fuel-feeding elements mounted in the enclosure coaxially of the rotor and extending transversely of the casing toward the inner surface thereof, the one of said fuel-feeding elements being rotatably connected to the rotor and having a rearwardly extending prolongation on its rear face in the form of a cusp-of-revolution, and the other of said elements being fixedly connected to said fuel inlet and having a forwardly directed portion of hollow cuspoidal shape surrounding the rearward prolongation on said rear face, said forwardly directed portion being in direct heat contact with the gases of combustion in said casing and being radially spaced from said prolongation and terminating rearwardly and inwardly of the outermost periphery of said rear face, the rearmost terminus of said central prolongation and the surrounding heated portion of said cuspoidal element being mutually organized to divide the incoming unbroken liquid fuel stream into a forwardly and radially directed hollow, thin walled, vaporous, preheated fuel film, having the form of a cusp-of-revolution, thereby to assure substantially complete combustion of all the fuel passing inwardly through said inlet.

5. In a turbo compressor jet propulsion unit that includes a casing having a rearwardly located jet orifice and a liquid fuel inlet into the casing and including a primary combustion zone rearwardly discharging combustion gases, a high efficiency afterburner, comprising: relatively movable fuel-feeding elements mounted in the enclosure coaxially of the rotor and extending transversely of the enclosure and substantially radially toward the inner surface thereof, the one of said fuel-feeding elements being rotatably connected to the rotor and the other of said elements being fixedly connected to said fuel inlet and forwardly directed therefrom to a terminus located adjacent the rear face of said rotatable member, said rotatable element having a wide area adjacent the periphery of its rear face extending radially considerably beyond the forward terminus of said fixed element and transversely across the exit path of the combustion gases from said primary combustion zone, said peripheral portion being thereby heated to a sufficient degree to constantly hold a flame thereat ignited from the said inlet fuel by the rearwardly exiting combustion gases, whereby to effect ignition of residual fuel contained in the gases exiting rearwardly from said primary combustion chamber, thereby to effect substantially complete combustion in said enclosure of all the combustible matter therein anterior to the jet orifice thereof.

6. A turbo-compressor jet engine, comprising: a casing having a forwardly located air inlet and a rearwardly located gas outlet and a fuel inlet port intermediate said outlet and said inlet; compressor means disposed in said casing adjacent said inlet; whereby a cylindrical gas-blast is produced, streaming from a forward to a rearward portion of said casing; rotation producing means disposed in said casing rearwardly of said compressor means and operatively connected thereto; rotary centrifugal type fuel-atomizing means disposed in the path of said blast and including relatively rotatable parts, the one of said parts consisting of a hollow, forwardly directed fuel-conducting member fixedly connected at its rearward end to said fuel inlet port, said member being radially flared at its opposite end, the other of said parts consisting of a rotary member connected to said rotation-producing means to be driven thereby, said rotary member having a flat front face confronting said blast to deflect the central portion of said blast radially outwardly and having a peripheral margin extending radially beyond the adjacent periphery of the flared member to shield the fuel gases forwardly emerging from between the fixed and rotary members of said fuel-atomizing means from said blast, thereby to prevent the blast from forcing the fuel gases back into the atomizing means; whereby to enable the centrifugal force of said rotary member to positively direct said gases perpendicularly across said blast.

7. A turbo-jet propulsion device, comprising: a casing having a forwardly located inlet and a rearwardly located outlet; means in the forward portion of said casing to produce a rearwardly directed cylindrical gas-blast streaming rearwardly to said outlet; rotary centrifugal type fuel-atomizing means in said casing disposed rearwardly of said blast producing means and in the path of said blast, and including a fixed member and a member cooperating therewith to form between them a conduit path for conducting fuel radially outwardly toward the wall of said casing and rotatable about an axis substantially coincident with the axis of said casing; and a fuel inlet for supplying combustion fuel; one of said members being connected to said fuel inlet for conducting fuel to the conduit path between said members and having an outer peripheral margin; the other of said members being located forwardly of said first mentioned member and having an impervious forwardly-facing wall to confront and deflect said gas blast radially outward toward the wall of said casing, and having a peripheral margin of greater diameter than that of said first mentioned member to prevent said gas blast from entering said conduit path; whereby said rotatable member throws the fuel in said conduit path radially outward in a thin film toward the wall of said casing and directly across the path of said gas blast to mix the fuel intimately therewith and promote combustion.

8. A turbo-jet propulsion device, comprising: a casing having a forwardly located inlet and a rearwardly located outlet; means in the forward portion of said casing to produce a rearwardly directed cylindrical gas-blast streaming rearwardly to said outlet; rotary centrifugal type fuel-atomizing means in said casing disposed rearwardly of said blast producing means and in the path of said blast, and including a forward and a rearward member, at least one of which is rotatable about an axis substantially coincident with the axis of said casing, forming between them a fuel conduit path having a continuous, annular, peripheral outlet to throw fuel in a thin film radially outward toward the wall of said casing and directly across the path of said gas blast to mix fuel intimately therewith and promote combustion; a fuel inlet for supplying combustion fuel; and conduit means connecting said fuel inlet with said fuel conduit path; the forward member having an impervious forwardly-facing wall to confront and deflect said gas blast radially outward toward the wall of said casing and having a peripheral margin of greater diameter than that of said rearward member to prevent said gas blast from entering said outlet and disrupting the flow of fuel.

ARTHUR L. KLEIN.

REFERENCES CITED

The following references are of record in the file of this patent:

UNITED STATES PATENTS

| Number | Name | Date |
|---|---|---|
| 442,865 | De Kinder | Dec. 16, 1890 |
| 923,856 | Kestner | June 8, 1909 |
| 1,547,739 | De Vilbiss | July 28, 1925 |
| 1,643,436 | Allardice | Sept. 27, 1927 |
| 1,722,504 | Morris | July 30, 1929 |
| 1,784,853 | Tiffany | Dec. 16, 1930 |
| 1,877,350 | Meachem | Sept. 13, 1932 |
| 2,177,053 | Boyd | Oct. 24, 1939 |
| 2,400,714 | Rowledge et al. | May 21, 1946 |
| 2,409,176 | Allen | Oct. 15, 1946 |
| 2,416,389 | Heppner et al. | Feb. 25, 1947 |
| 2,479,777 | Price | Aug. 23, 1949 |
| 2,538,179 | Weinhardt | Jan. 16, 1951 |

FOREIGN PATENTS

| Number | Country | Date |
|---|---|---|
| 52,634 | Sweden | Sept. 6, 1922 |